United States Patent
Samuel et al.

(10) Patent No.: US 12,061,723 B2
(45) Date of Patent: Aug. 13, 2024

(54) DATA IMPORTANCE ASSESSMENT IN A DATA SHARING PLATFORM

(71) Applicant: Cisco Technology, Inc., San Jose, CA (US)

(72) Inventors: Louis Gwyn Samuel, Gloucestershire (GB); Oliver James Bull, Bristol (GB); Nicholas Bradley Selk, Mount Pleasant, SC (US)

(73) Assignee: Cisco Technology, In nc., San Jose, CA (US)

( * ) Notice: Subject to any disclaimer, the term of this patent is extended or adjusted under 35 U.S.C. 154(b) by 244 days.

(21) Appl. No.: 17/477,009

(22) Filed: Sep. 16, 2021

(65) Prior Publication Data
US 2023/0078109 A1    Mar. 16, 2023

(51) Int. Cl.
G06F 21/62    (2013.01)
G06F 9/54     (2006.01)

(52) U.S. Cl.
CPC .......... G06F 21/6254 (2013.01); G06F 9/547 (2013.01)

(58) Field of Classification Search
None
See application file for complete search history.

(56) References Cited

U.S. PATENT DOCUMENTS

| | | | |
|---|---|---|---|
| 9,628,363 B2 | 4/2017 | Singh et al. | |
| 2002/0007453 A1* | 1/2002 | Nemovicher | H04L 63/105 713/170 |
| 2002/0143930 A1* | 10/2002 | Babu | G08G 1/20 709/224 |
| 2004/0177002 A1* | 9/2004 | Abelow | G06Q 10/0639 705/14.19 |
| 2011/0295694 A1 | 12/2011 | Coggeshall et al. | |
| 2016/0300255 A1 | 10/2016 | Snir et al. | |
| 2019/0204110 A1* | 7/2019 | Dubielzyk | G01C 21/3423 |
| 2021/0182915 A1* | 6/2021 | Blaikie, III | G06Q 30/0276 |

OTHER PUBLICATIONS

Buhalis, et al., "Bridging marketing theory and big data analytics: The taxonomy of marketing attribution", International Journal of Information Management 56, Feb. 2021, 14 pages, Science Direct, Elsevier.

* cited by examiner

*Primary Examiner* — William J. Goodchild
(74) *Attorney, Agent, or Firm* — BEHMKE INNOVATION GROUP LLC; James M. Behmke; Keith O. Mitchell

(57) ABSTRACT

In one embodiment, a data sharing platform uses data associated with a data owner to share data via a plurality of sharing services, each sharing service in the plurality of sharing services providing a different type of data. The data sharing platform tracks access to each of the plurality of sharing services. The data sharing platform computes, based in part on the access to each of the plurality of sharing services, an importance metric for the data associated with the data owner. The data sharing platform provides an indication of the importance metric for display to the data owner.

20 Claims, 8 Drawing Sheets

DATA IMPORTANCE ASSESSMENT IN A DATA SHARING PLATFORM

TECHNICAL FIELD

The present disclosure relates generally to a data sharing platform, and, more particularly, to data importance assessment in a data sharing platform.

BACKGROUND

As the Internet continues to mature, more and more data is being produced by users and their devices. Often, this data is collected and used in exchange for the ability to access a particular service. For instance, a user may consent to sharing their personal information in exchange for the ability to access a social media service. In another example, a user may consent to their emails being scanned for keywords, in exchange for the ability to use an email service.

A fundamental shift in the traditional model for data sharing now puts the user in control of how and when their data is shared. Indeed, the General Data Protection Regulation (GDPR) in the European Union, as well as similar laws and regulations elsewhere, now affords users of online services greater control over their own data. To date, however, their data is still 'valued' equally with that of other users of the same service, as each user is simply granted access to that service in exchange for their data. This is not always the case, though, as certain types of data may be more useful/important to the service than others.

As disclosed herein, another potential approach to data sharing consists of using a data sharing platform through which a user can share their data with any number of different data consumers, as opposed to simply a singular service that they wish to access. This presents new opportunities, such as affording a user access to one particular service, in exchange for sharing their data with one or more other data consumers. To facilitate this, though, there still needs to be mechanisms in place to assess the importance of their data to the various data consumers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
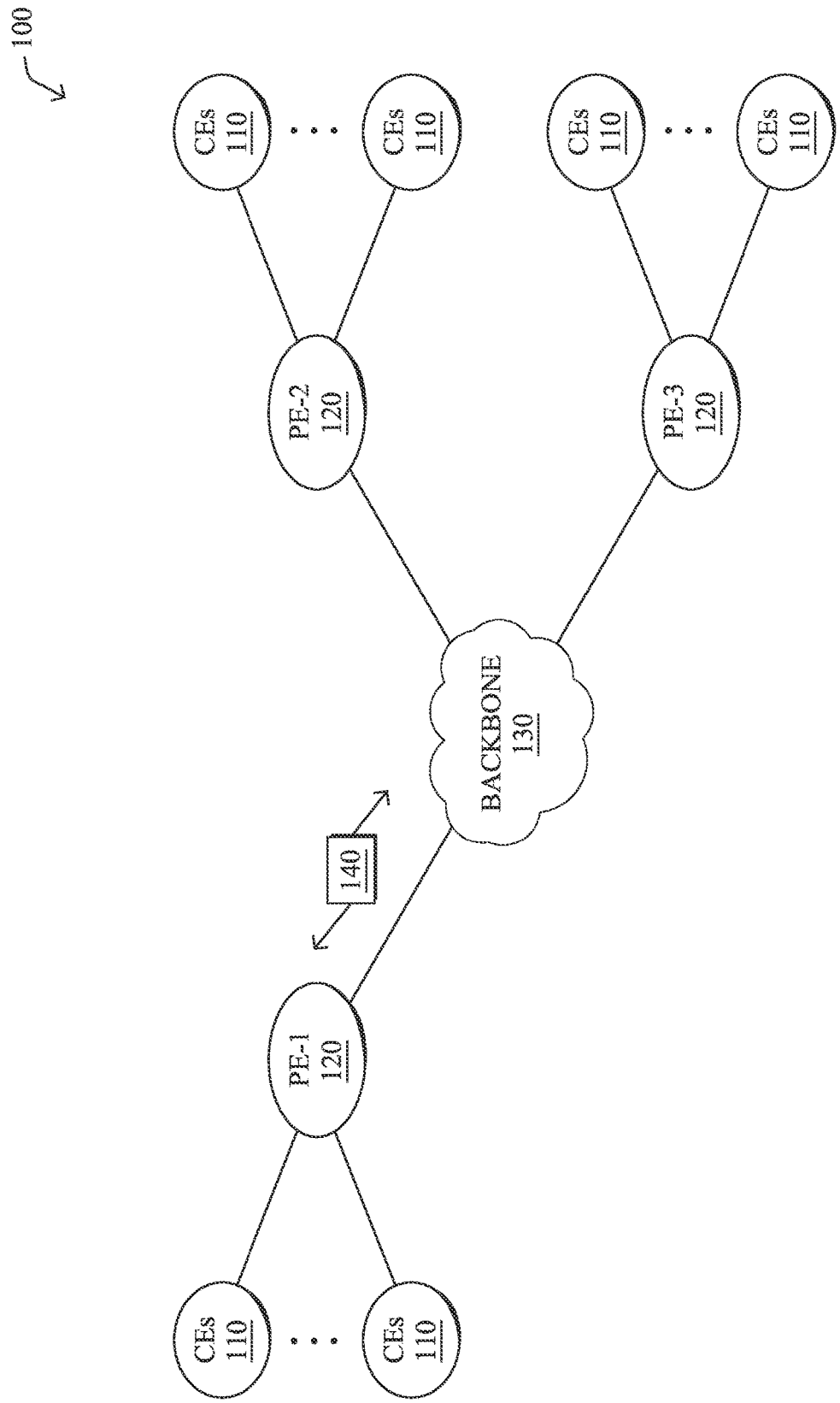
FIGS. 1A-1B illustrate an example communication network.

According to one or more embodiments of the disclosure, a data sharing platform uses data associated with a data owner to share data via a plurality of sharing services, each sharing service in the plurality of sharing services providing a different type of data. The data sharing platform tracks access to each of the plurality of sharing services. The data sharing platform computes, based in part on the access to each of the plurality of sharing services, an importance metric for the data associated with the data owner. The data sharing platform provides an indication of the importance metric for display to the data owner.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B 1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
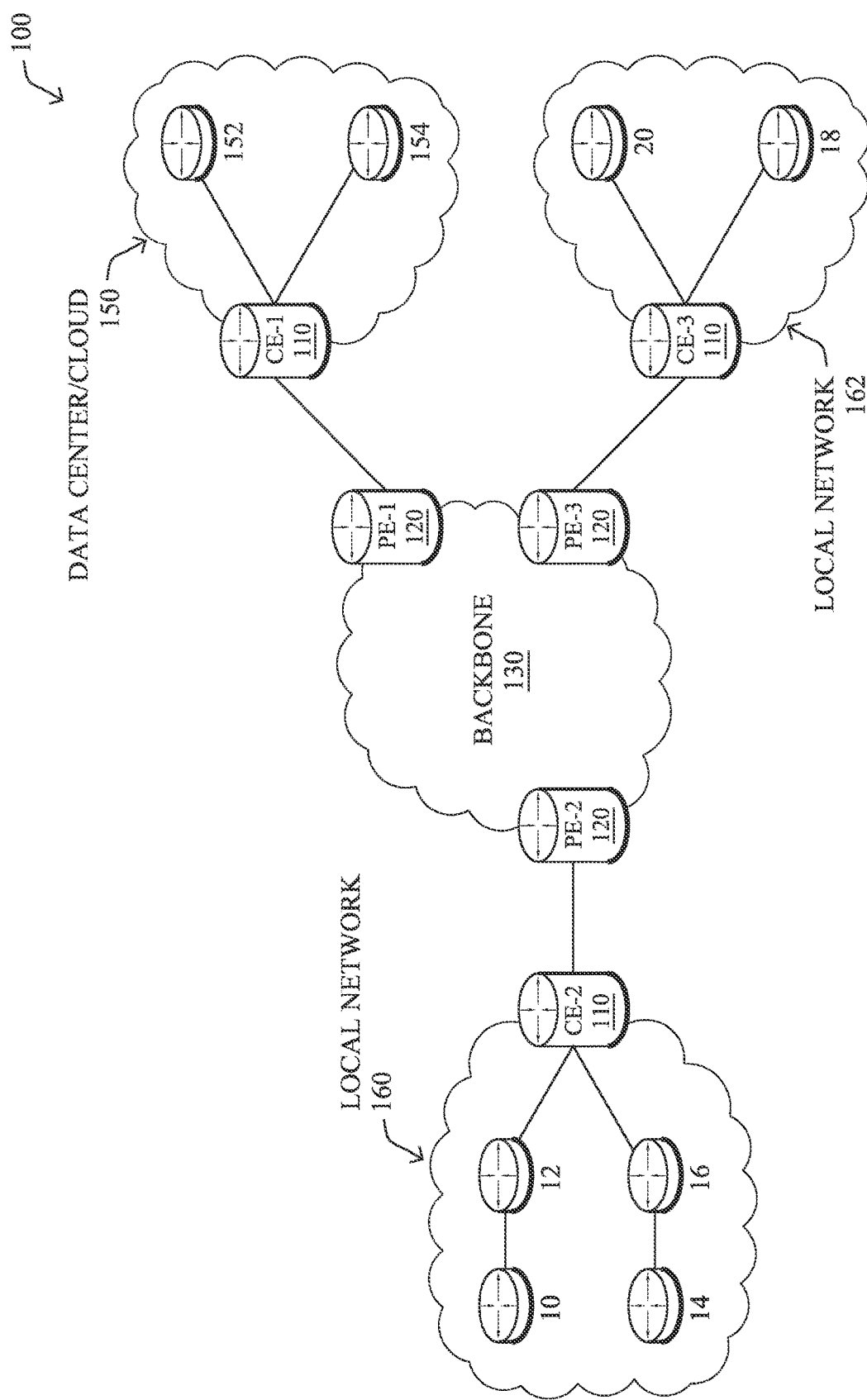

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
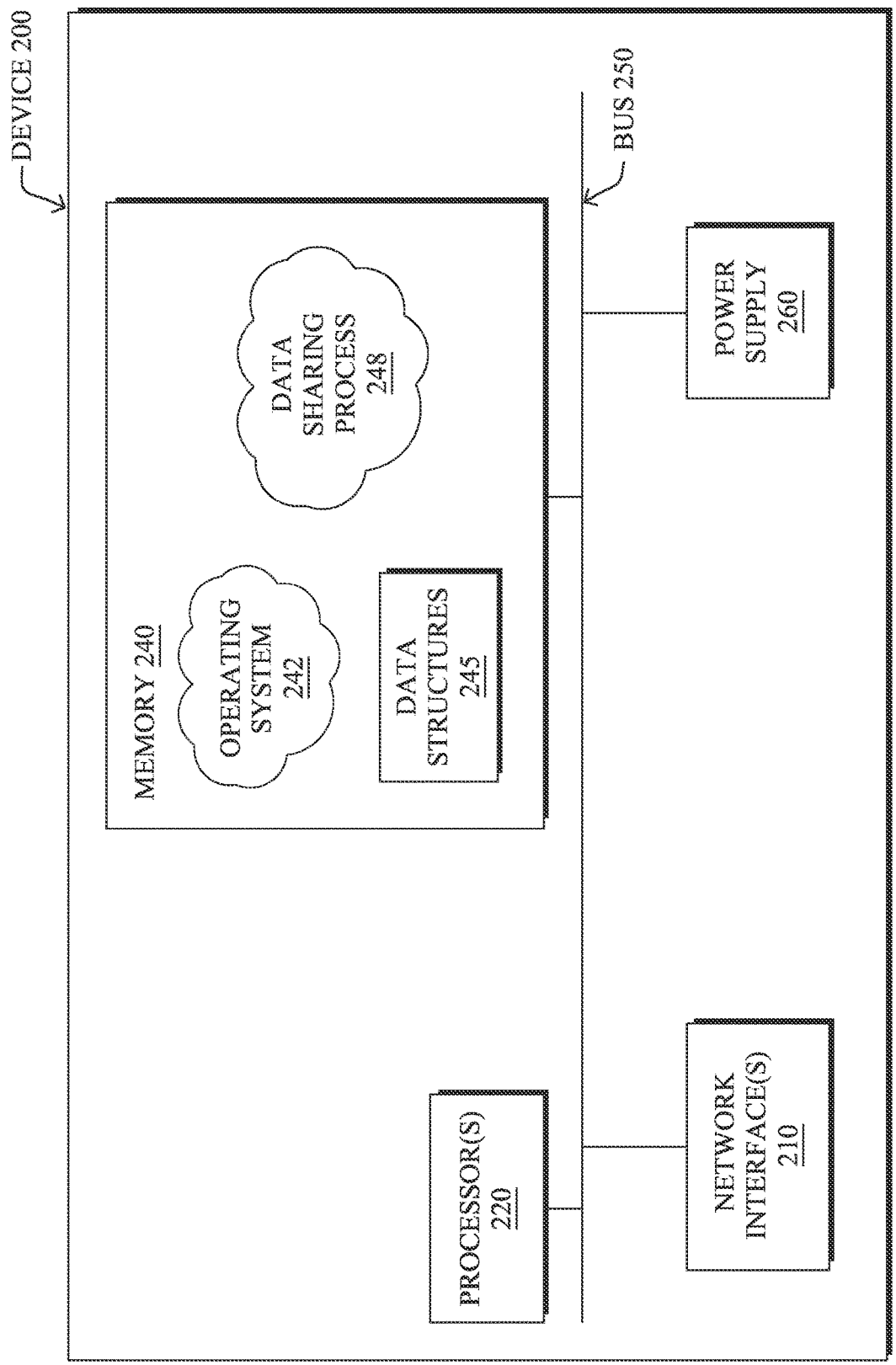
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a data sharing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, as the Internet continues to mature, more and more data is being produced by users and their devices. Often, this data is collected and used in exchange for the ability to access a particular service. For instance, a user may consent to sharing their personal information in exchange for the ability to access a social media service. In another example, a user may consent to their emails being scanned for keywords, in exchange for the ability to use an email service.

A fundamental shift in the traditional model for data sharing now puts the user in control of how and when their data is shared. Indeed, the General Data Protection Regulation (GDPR) in the European Union, as well as similar laws and regulations elsewhere, now affords users of online services greater control over their own data. To date, however, their data is still 'valued' equally with that of other users of the same service, as each user is simply granted access to that service in exchange for their data. This is not always the case, though, as certain types of data may be more useful/important to the service than others.

According to various embodiments, another potential approach to data sharing consists of using a data sharing platform through which a user can share their data with any number of different data consumers, as opposed to simply a singular service that they wish to access. This presents new opportunities, such as affording a user access to one particular service, in exchange for sharing their data with one or more other data consumers. To facilitate this, though, there still needs to be mechanisms in place to assess the importance of their data to the various data consumers Datan Importance Assessment in a Data Sharing Platform The techniques introduced herein allow for the determination of the importance of data associated with a data owner of a data sharing platform. In some aspects, the data sharing platform may use the data associated with the user to provide various use-case dependent, sharing services. Indeed, a data consumer may not have need of the entirety of the data associated with the user, but only a small portion thereof. In other instances, the data consumer may not even need or want the actual data associated with the user, but other data that can be derived therefrom (e.g., an aggregated value, a computed value, etc.). In these and other instances, the techniques herein can be used to determine the overall importance of the data associated with the user to the data sharing platform.

Illustratively, the techniques described herein may be performed by hardware, software, and/or firmware, such as in accordance with data sharing process 248, which may include computer executable instructions executed by the processor 220 (or independent processor of interfaces 210) to perform functions relating to the techniques described herein.

Specifically, according to various embodiments, a data sharing platform uses data associated with a data owner to share data via a plurality of sharing services, each sharing service in the plurality of sharing services providing a different type of data. The data sharing platform tracks access to each of the plurality of sharing services. The data sharing platform computes, based in part on the access to each of the plurality of sharing services, an importance metric for the data associated with the data owner. The data sharing platform provides an indication of the importance metric for display to the data owner.

Figure 3:
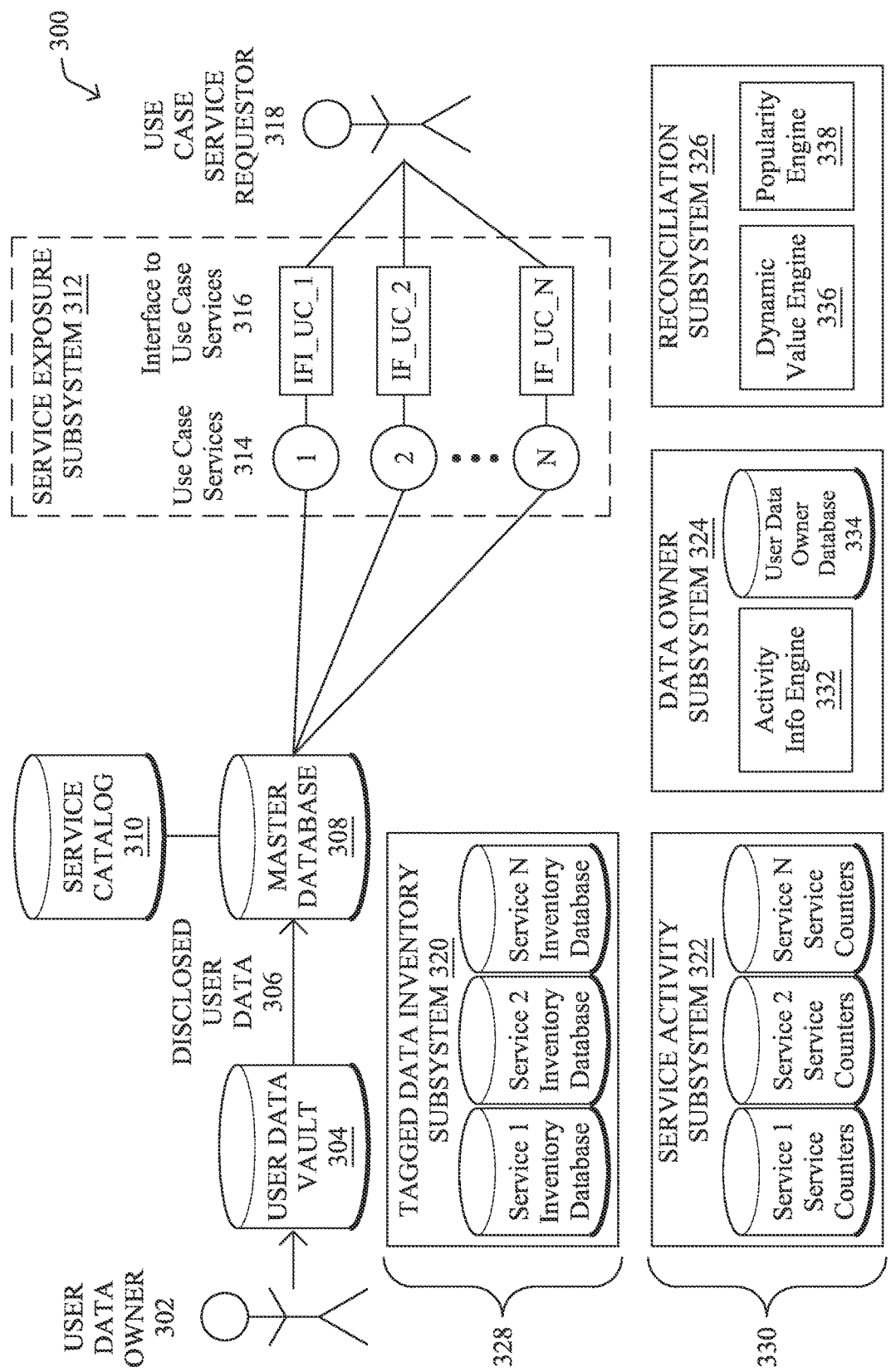
FIG. 3 illustrates an example architecture for a data sharing platform.

Operationally, FIG. 3 illustrates an example architecture for a data sharing platform 300, according to various embodiments. As shown, data sharing platform 300 may be implemented through the execution of data sharing process 248 by one or more devices, such as device 200. In many instances, data sharing platform 300 may be implemented in a distributed manner and/or as a cloud-based service. In these cases, the executing servers/devices may be viewed as a singular device for purposes of implementing data sharing platform 300.

As shown, data sharing platform 300 may include any or all of the following components: a user data vault 304, a master database 308, a service catalog 310, a service exposure subsystem 312, a tagged data inventory subsystem 320, a service activity subsystem 322, a data owner subsystem 324, and a reconciliation subsystem 326. As would be appreciated, the functionalities of these components may be combined or omitted, as desired.

During operation, data sharing platform 300 may include any or all of the following system features:

A user, such as data owner 302, holds/owns their data, which is stored by data sharing platform 300 in a user data vault 304. In other words, ownership of their data is never relinquished in data sharing platform 300, allowing the user to control how and where their data is used. In further embodiments, data owner 302 may be an organization or other entity, instead of an individual user.

All data stored in user data vault 304 is considered private.

User data owner 302 may selectively and permissively expose/discloses their data to master database 308 of data sharing platform 300 from user data vault 304. Generally, master database 308 stores all the disclosed user data 306 and any derived data used by any use case service 314, as detailed below.

Data sharing platform 300 then uses the data in master database 308 in a variety of ways, to provide a variety of use case services 314 towards third-party data consumers, such as use case service requestor 318. This may be done, for instance, via an application programming interface (API) of data sharing platform 300 or other interface 316 for use case services 314. For the purposes of explanation, the use case services 314 and interfaces 316 to the services compose service exposure subsystem 312.

In addition to the above components, data sharing platform 300 may also include the following subsystems, in various embodiments:

Tagged data inventory subsystem 320—this subsystem contains the inventory data base 328 per use case service 314. In other words, tagged data inventory subsystem 320 maintains an inventory of the tagged disclosed user data 306 that is used in a given use case service 314.

Service activity subsystem 322—this subsystem may include activation and usage counters 330 per use case service 314 that track their usage, such as the number of times that a particular use case service 314 is activated and the number of interface events that occur per use case service activation.

Reconciliation subsystem 326—this subsystem queries service activity subsystem 322 and tagged data inventory subsystem and derives a popularity score for the components of data used in each use case service. The popularity score may then be used to set the importance metric for the tagged user data, dynamically.

Data owner subsystem 324—this subsystem may store information about user data owner 302 in a user data owner database 334, as well as for the other users of data sharing platform 300.

Figure 4:
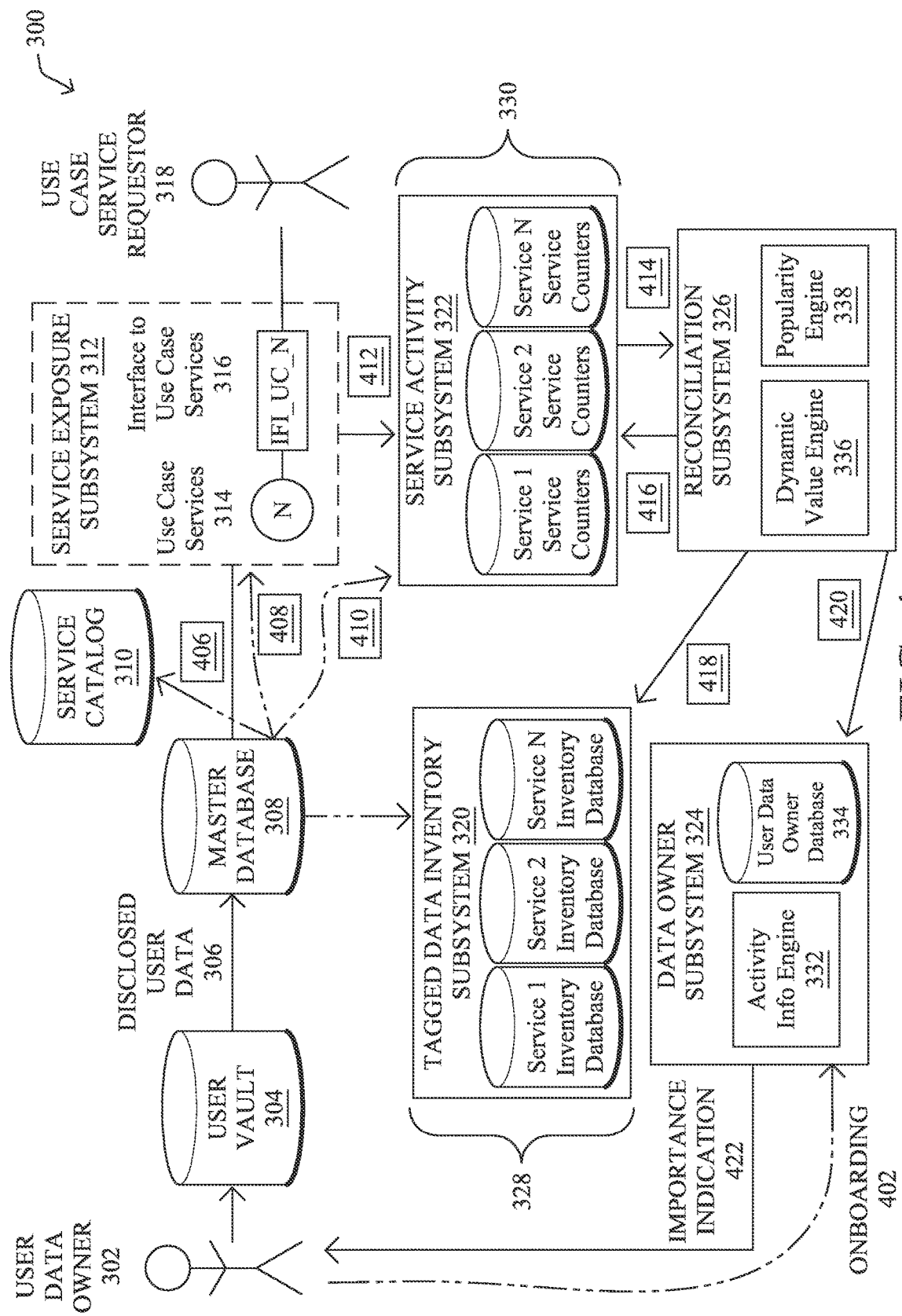
FIG. 4 illustrates an example of the evaluation of data shared by a data owner of the data sharing platform of FIG. 3.

FIG. 4 illustrates an example of the evaluation of data shared by a data owner of the data sharing platform of FIG. 3, according to various embodiments. Continuing the example of FIG. 3, data sharing platform 300 may operates as follows:

First, an onboarding 402 may be performed for user data owner 302 during which a record of user data owner 302 is created in data owner subsystem 324 and stored in user data owner database 334, in some embodiments. In one embodiment, the act of creating this record may also create a master hash used for data ownership attribution by data sharing platform 300 for data contributed by user data owner 302.

Next, user data owner 302 discloses private data from user data vault 304 to master database 308. Note that user data vault 304 may take the form a physical or virtual location, either on a local device of user data owner 302 or in a remote location, such as in the cloud. If user data vault 304 is located at a virtual location, it may even be a secure, private area of master database 308, in one embodiment.

The data associated with user data owner 302 in user data vault 304 may be captured in any number of ways. In some embodiments, such data may be captured, automatically, by one or more devices associated with user data owner 302. For instance, assume that user data owner 302 has outfitted her home as a 'smart' home that includes a number of home automation devices (e.g., sensors, cameras, actuators, etc.). In such a case, user data vault 304 may include data captured by these devices, of which user data owner 302 may opt to disclose some or all of the data for sharing. Note, however, that the data associated with user data owner 302 in user data vault 304 may also include data captured by other devices not owned or operated by user data owner 302, such as those used to provide online services to user data owner 302 (e.g., a social media service, an email service, etc.).

As data is captured and stored in user data vault 304, data sharing platform 300 may tag it with an identifier associated with user data owner 302. Such an ownership tag may be derived as part of onboarding 402. However, more generally, the ownership tag can be any form of tag that anonymizes user data owner 302 to the rest of the system. This allows data sharing platform 300 to minimize the chance of any data leakage that could identify user data owner 302.

In some embodiments, user data owner 302 may conditionally disclose data 306 for sharing, based on the computed importance/value of that data. For instance, if a certain portion of their data is of low importance to data sharing platform 300, user data owner 302 may decide that they would prefer to keep that data private and undisclosed to master database 308. In one embodiment, user data owner 302 may set a parameter that controls whether their data is disclosed, based on its computed importance metric. Conversely, if the importance metric of certain data is below a threshold defined by user data owner 302, data sharing platform 300 may withdraw that data from use in service exposure subsystem 312.

When data sharing platform 300 creates a new use case service 314, the user data used by that service may be tracked by tagged data inventory subsystem 320 via inventory data base 328. In addition, the new use case service 314 may be cataloged in service catalog 310, in a further embodiment. Generally, service catalog 310 allows an interested party to search and access a desired use case service 314. When a use case service 314 is published to service catalog 310, an activity record may also be created in service activity subsystem 322, which tracks the usage of that service. Activation of a use case service 314 may be by direct request by case service requestor 318 for a particular use case service, API activity, or some other mechanism.

Thus, through the operation of the above components of data sharing platform 300, user data owner 302 can elect to share any or all of their data via any number of use case services 314 through service exposure subsystem 312. Typically, each use case service 314 may provide different type of data than that of another. For instance, one use case service 314 may provide information regarding bandwidth usage by different homes, while another use case service 314 may provide information regarding thermostat settings in those homes. Another use case service 314 may provide information derived from searches performed by data owner 302 using their personal device (e.g., a mobile phone, computer, etc.).

Note also that, in some embodiments, the data shared via a use case service 314 may not actually expose disclosed user data 306 to case service requestor 318. Instead, a given use case service 314 may simply use disclosed user data 306 to compute an aggregated value (e.g., a statistic, etc.) or other value computed using disclosed user data 306. For instance, one use case service 314 may simply provide the average bandwidth usage for homes located in a certain geographic area, without exposing the bandwidth usage by any particular house.

Once disclosed user data 306 is being used in one or more use case services 314, data sharing platform 300 may begin tracking usage of those services and computing the importance of that data. Generally, the importance of disclosed user data 306 may be based on any or all of the following factors, which represent the demand for any use case service 314 that leverages that data:

The number of individual activations of the use case service 314.

The number of times an individual requestor accesses the interface 316 (e.g., API) for that use case service 314.

The above log data 412 may be tracked by 322 and stored by service activity subsystem 322. In turn, service activity subsystem 322 may aggregate the logs per use case service 314 over a predefined measurement interval. The measurement interval can be any timed interval (e.g., daily, hourly, etc.), and potentially adjustable, depending on the popularity of the use case service 314.

In turn, reconciliation subsystem 326 may reconcile the data importance of data used by a use case service 314 back to the owner/originator of that data, such as user data owner 302. As would be appreciated, the same data may be used in different use case services 314 and have different attributable importance metrics. Accordingly, reconciliation subsystem 326 may take this into account, automatically. To do so, popularity engine 338 of reconciliation subsystem 326 may receive the log data 414 and compute any or all of the following values, according to various embodiments:

$$\text{Volume}(V) = \frac{\text{Total Interface Traffic} + \text{Total \# Service Activations}}{\text{Unit Time}}$$

$$\text{Popularity}(P) = \frac{V_1 - V_2}{T_2 - T_1} = \frac{\Delta V}{\Delta T}$$

Volume Earned (E)=A*V where A is the cost of access to the use case service 314.

As would be appreciated, the 'cost' of access to any particular use case service 314 may be measured in any number of different ways, depending on how user data owner 302 is credited for sharing their data. Indeed, the value of A may take the form of a monetary amount, an amount of resources (e.g., time of access, computational power, electricity consumption, etc.), or any other thing that a data consumer, such as case service requestor 318 may use as compensation to user data owner 302. For instance, case service requestor 318 may offer a certain amount of playing time of an online game, in exchange for access to a particular use case service 314.

In various embodiments, reconciliation subsystem 326 may also include dynamic value engine 336, which is responsible for adjusting the 'cost' of a data consumer accessing a particular use case service 314 at any given time. In turn, dynamic value engine 336 may publish the service cost information null 416 to service activity subsystem 322. To do so, dynamic value engine 336 of reconciliation subsystem 326 may also apply any or all of the following rules, in various embodiments:

If $$P = \frac{\Delta v}{\Delta T} > 0$$

(i.e., positive), dynamic value engine 336 may increase the cost for that use case service 314 in the next unit time interval.
The service cost continues to increase until $$\frac{\Delta V}{\Delta T} = 0 + \varepsilon_1$$

The $\varepsilon_1$ can be arbitrarily set and can be adjusted to maximize the duration that $$\frac{\Delta V}{\Delta T} > 0.$$

If $$\frac{\Delta V}{\Delta T} < 0$$

(i.e., negative), the service cost is decreased in the next unit time interval.
The service cost continues to decrease until $$\frac{\Delta V}{\Delta T} = 0 + \varepsilon_2$$

The $\varepsilon_2$ can be arbitrarily set and can be adjusted to minimize the duration that $$\frac{\Delta V}{\Delta T} < 0.$$

Figure 5A:
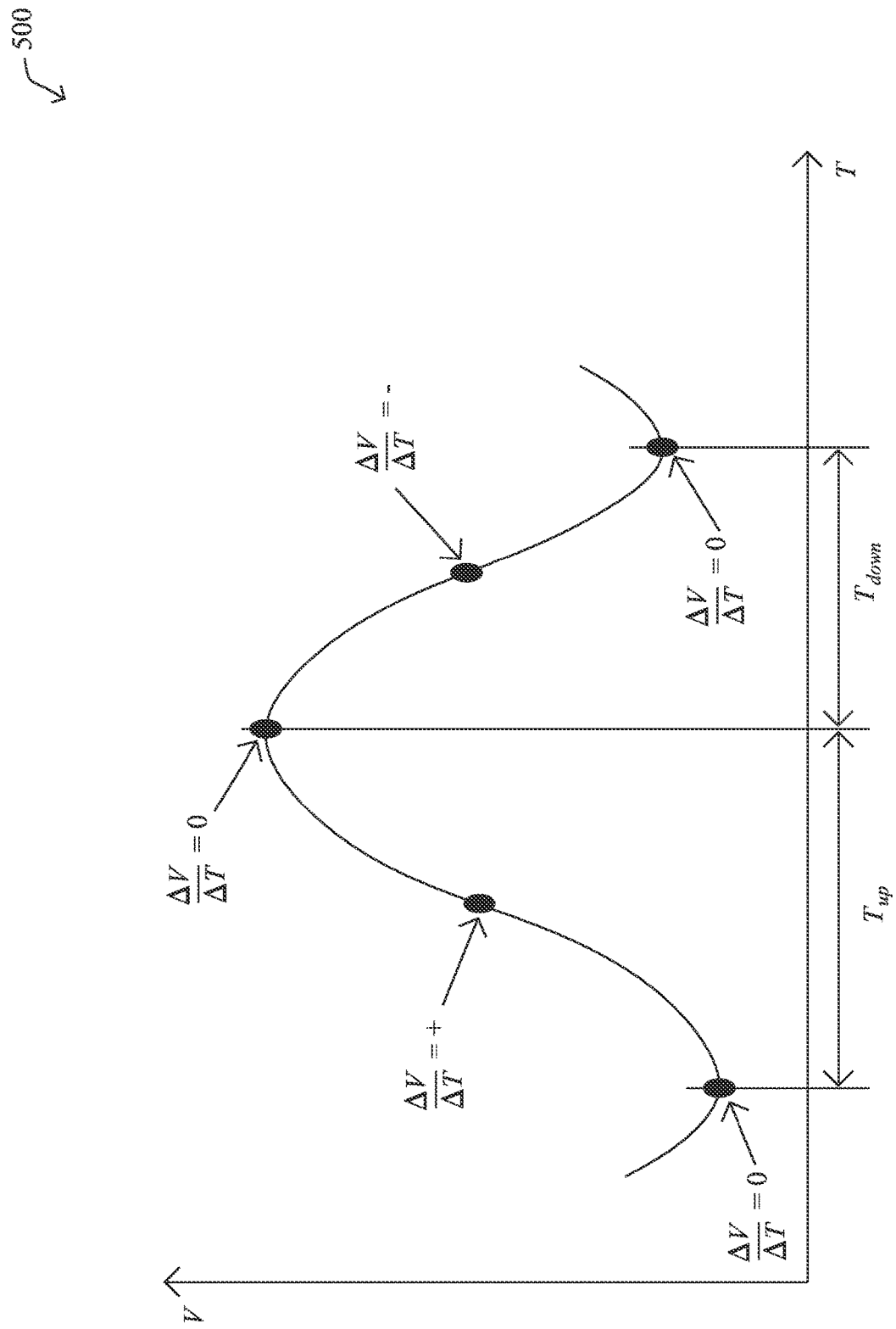
FIGS. 5A-5B illustrate example plots showing the evaluation of data shared using a data sharing platform.

FIG. 5A illustrates an example plot 500 showing the value of $$P = \frac{\Delta v}{\Delta T} \text{ where } \frac{\Delta v}{\Delta T} = +$$

indicates an increase in the popularity of the use case service 314 over time, whereas $$\frac{\Delta v}{\Delta T} = -$$

indicates a decrease in the popularity. Here, $T_{up}$ is the time during which the popularity of the service increases, whereas $T_{down}$ is the time during which the popularity of the service decreases. In various embodiments, dynamic value engine 336 may implement a control loop mechanism that seeks to maximize $T_{up}$.

Figure 5B:
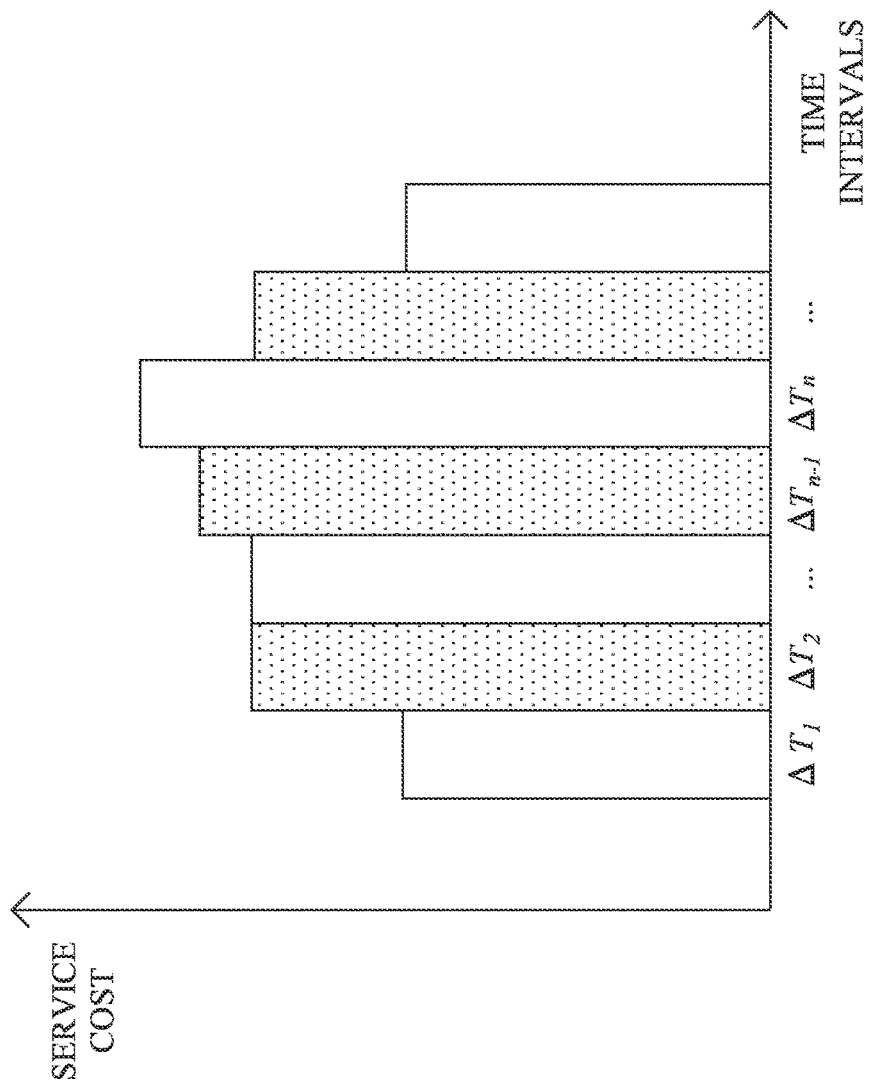

FIG. 5B illustrates an example plot 510 of the cost of a use case service 314 over time during different time units/intervals. Here, dynamic value engine 336 may adaptively increase or decrease the cost to access the use case service 314, based on the popularity of the service. In other words, popularity engine 338 may seek to find the appropriate service cost for any given time interval, based on how that service has performed in the past.

Accordingly, and with reference again to FIG. 4, reconciliation subsystem 326 may operate as follows:

Each active service, Service$_i^k$, where k indicates the instance and i indicates the service in service catalog 310, has a service cost associated with it, $A_i$. Reconciliation subsystem 326 pulls log data 414 from service activity subsystem 322 for those active services (Service$_i^k$) at the end of a service measurement period. In turn, service activity subsystem 322 uses the log data 414 for the Service$_i^k$ and its service cost, $A_i$, to calculate the volume earned by the use case service 314, E, from each measurement interval (e.g., as shown in FIG. 5A.

At this point there are two possibilities:
1. Calculate the volume earned per instance k, i.e., $E_i^k$. The service cost can then be adjusted to optimize the earning potential of the instance k (e.g., by calculating a new $A_i^k$ for the next measurement period). The implication here is that reconciliation subsystem 326 keeps track of volume earned per instance k, which is then reflected in how important the data is that is attribute back to the contributing data owner, such as user data owner 302.

2. Alternatively, reconciliation subsystem 326 may aggregate the volume earned, E, across all instances of the service, i.e., $E_i^T = N_j^N E_i^j$ and the service cost is adjusted uniformly for the service (e.g., by calculating a new $A_i$ for the next measurement period). In this instance, reconciliation subsystem 326 may keep track of the volume earned per service, i.

In either of the above, reconciliation subsystem 326 may calculate the volume earned in the measurement period for the given active use case services 314. Reconciliation subsystem 326 may also calculate the new measurement periods and set them for the next measurement period, in some embodiments. More specifically, the measurement periods can also be of variable duration and are calculated by dynamic value engine 336, depending on the popularity of the service, in order to maximize the earning potential of the use case service 314. For example, dynamic value engine 336 may:

Shorten the measurement period if the use case service 314 is popular (e.g., a service with $$\frac{\Delta V}{\Delta T} > 0),$$

in order to increase the number of opportunities of increasing the service cost. The effect of this would be a steeper $T_{up}$ portion of the curve shown in FIG. 5A.

Lengthen the measurement period for services which are becoming less popular (e.g., a service with $$\frac{\Delta V}{\Delta T} < 0),$$

in order to again maximise the earning potential of the use case service 314. The effect of this would be a shallower $T_{down}$ portion of the curve shown in FIG. 3.

In some instances, at the end of the measurement period, reconciliation subsystem 326 may regroup the active service instances into groupings of similar measurement periods. The measurement periods are designed such that the longest measurement period is an integer multiple of the shortest measurement period.

Reconciliation subsystem 326 may then send a query 418 to tagged data inventory subsystem 320 for each service, i, whose volume earned, $E_i$, was calculated at the end of the current measurement period. Using the results of query 418, reconciliation subsystem 326 may then apportion importance metrics to each element of disclosed user data 306 that contributed to the service, i. The data itself may also have a hashed identifier tag associated with it, that can be used to identify user data owner 302.

Once reconciliation subsystem 326 has calculated the importance metric contributed by each data element of disclosed user data 306 per active use case service 314, reconciliation subsystem 326 may then send the resulting importance measurement record 420 to data owner subsystem 324.

Note that, depending on the necessary performance requirements of the physical system, the above operations can be optimized to meet certain performance requirements. Additionally, reconciliation subsystem 326 may keep a current record of those use case services 314 that are the most popular services, along with a data tag summary for the data contained in the most popular use case service 314, in one embodiment. Reconciliation subsystem 326 may send this popular data tag summary to data owner subsystem 324 at a rate which clearly distinguishes the popularity trends. More specifically, the data tag summary may include user search tags for the popular data types (e.g., used by data consumers to query service catalog 310 for available types of shared data).

In various embodiments, activity info. engine 332 in data owner subsystem 324 may use the importance measurement record 420 from reconciliation subsystem 326 to perform any or all of the following:

1. Check the tag in importance measurement record 420 against the owner tags in user data owner database 334, in order to get the final identity of the data owner, such as user data owner 302.
2. Check the rules in user data owner database 334 for how a finalized importance metric for disclosed user data 306 should be applied.

In turn, activity info. engine 332 may provide an importance indication 422 for display to user data owner 302, indicative of the importance metric for their disclosed user data 306. Such a report may also include a breakdown of the importance metrics for different elements of disclosed user data 306, as well as an indication as to how that data is being used.

In various embodiments, data owner subsystem 324 may also use the computed importance metric for the disclosed user data 306 as a credit for user data owner 302. For instance, by opting to share disclosed user data 306 via data sharing platform 300, user data owner 302 may earn the ability to access certain online services, depending on the importance of that data (e.g., by earning playing time in an online game, storage space in an online file storage service, etc.).

As noted, data sharing platform 300 may also tag and track the most popular types of user data leveraged by service exposure subsystem 312. Accordingly, in some embodiments, data owner subsystem 324 may also provide information to user data owner 302 based on these tags, to allow user data owner 302 to make a better decision as to how their data in user data vault 304 may be shared. For instance, if a particular data tag is not currently part of their owner tag, data sharing platform 300 may encourage user data owner 302 to share that type of data for use by service exposure subsystem 312. In other words, the data sharing platform may, in some cases, attempt to incentivize the data owner to allow one or more other use case services 314 to use their data. In another example, the data sharing platform may indicate to data owner 302 the current usage of their data, so that they may make a more informed decision as to how their data is used by the data sharing platform (e.g., by opting into or out of a particular use case service using their data, etc.). Thus, the data sharing platform may operate in a closed loop manner whereby data owner 302 receives updated information about how their data is being used by data sharing platform 300, so that data owner 302 can control how their data is shared/used over time.

Other forms of information that data sharing platform 300 may provide for display to user data owner 302 may relate to the automatic selection of data in user data vault 304 for publication to master database 308. For instance, if user data owner 302 indicates that a certain type of data should not be shared unless its importance metric is above a threshold parameter, data sharing platform 300 may indicate to user data owner 302 whether that data has or has not been exposed to master database 308.

Figure 6:
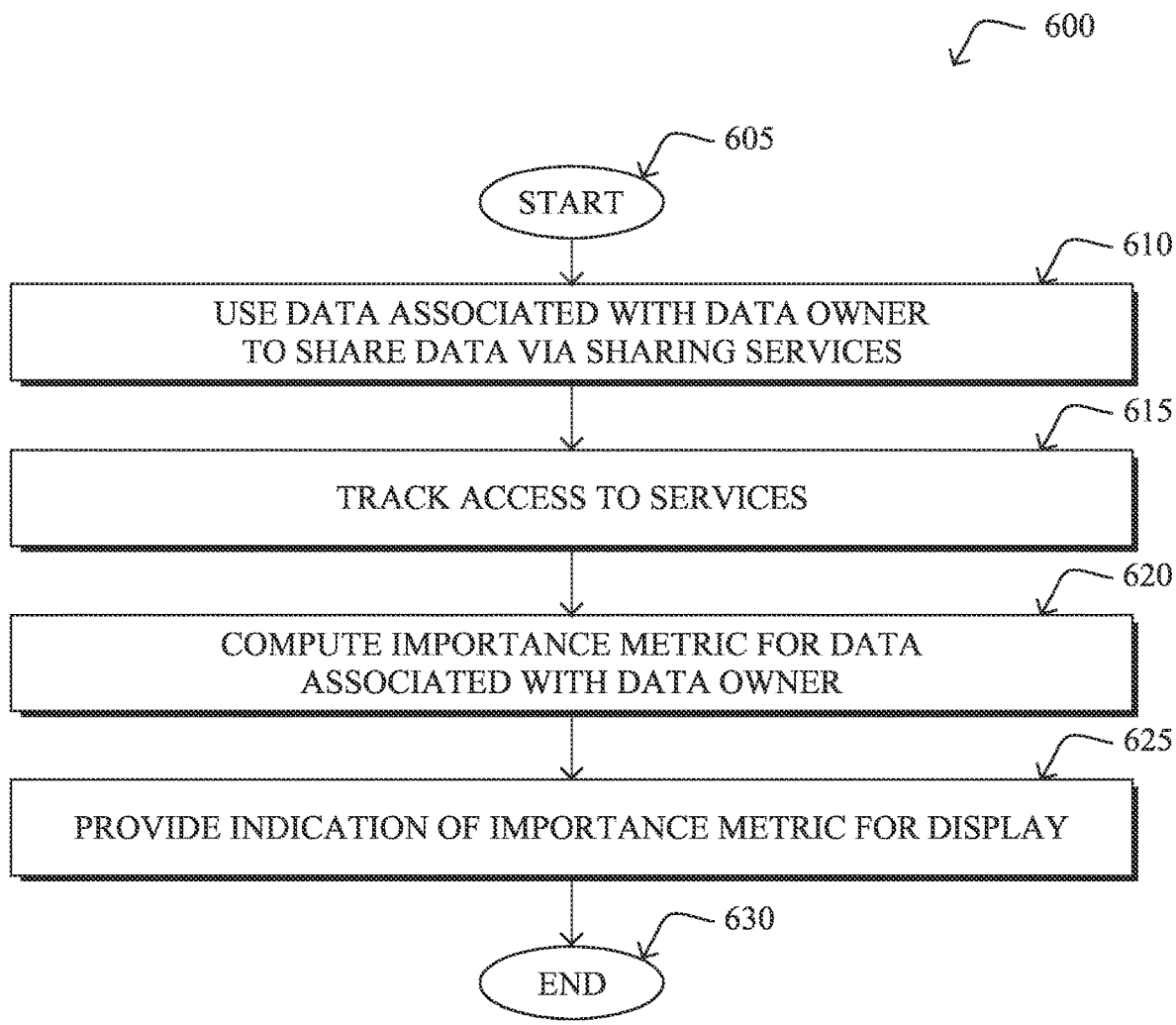
FIG. 6 illustrates an example simplified procedure for determining an importance metric for data used in a data sharing platform.

FIG. 6 illustrates an example simplified procedure (e.g., a method) for determining an importance metric for data used in a data sharing platform, in accordance with one or more embodiments described herein. For example, a non-generic, specifically configured device (e.g., device 200), may perform procedure 600 by executing stored instructions (e.g., data sharing process 248), to provide a data sharing platform. The procedure 600 may start at step 605, and continues to step 610, where, as described in greater detail above, the data sharing platform may use data associated with a data owner to share data via a plurality of sharing services, each sharing service in the plurality of sharing services providing a different type of data. In some instances, the shared data may include the raw data associated with the user. In other instances, the shared data may be derived from the raw data associated with the user, such as sharing aggregated or computed data using the data associated with the user. In some embodiments, the data sharing platform may only use the data associated with the user based on a request from the data owner to share their data.

At step 615, as detailed above, the data sharing platform may track access to each of the plurality of sharing services. In some embodiments, the data sharing platform may publish, to a searchable catalog of services, the plurality of sharing services. This allows different data consumers to search for the different types of data available via those services. For tracking purposes, in some embodiments, the data sharing platform may associate an anonymized token with the data associated with the data owner, prior to using the data associated with the data owner to share data via the plurality of sharing services. This allows the data sharing platform to correlate the data shared by the various services back to the data owner. In some embodiments, the plurality of sharing services may be accessed via one or more APIs of the data sharing platform.

At step 620, the data sharing platform may compute, based in part on the access to each of the plurality of sharing services, an importance metric for the data associated with the data owner, as described in greater detail above. In some embodiments, the data sharing platform may compute ratings for the plurality of sharing services and the data sharing platform may compute the importance metric based in part on those ratings. In a further embodiment, the data sharing platform may increase a rating of a particular one of the plurality of sharing services, based on a popularity of that sharing service. In other words, if a certain sharing service is popular, the importance of the data associated with the user may be increased.

At step 625, as detailed above, the data sharing platform may provide an indication of the importance metric for display to the data owner. Thus, the user may review how important their data is in the data sharing platform, which may affect their data sharing decisions. In some embodiments, the data sharing platform may use the importance metric as a credit against use of one or more services by the data owner. For instance, the user may be allowed to use a social networking service, an email service, etc., through the use of a credit given to them by the data sharing platform for sharing their data. In other instances, the data sharing platform may credit the user by arranging for payment to that user, based on the importance metric for their data. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Accordingly, the techniques herein introduce a mechanism that allows a data owner to disclose, with fine granularity, their data to be consumed by various use case data sharing services of a data sharing platform. In another aspect, the system may allow the data owner to set an acceptable importance threshold for their data, to dynamically control when their data is used by the sharing services. In an additional aspect, the techniques herein may use the data from the data own in a variety of ways and determine the overall importance of the use of that data in the data sharing platform. In a further aspect, the techniques herein allow the data sharing platform to report the popularity/importance and use of data back to the owner of that data.

While there have been shown and described illustrative embodiments that provide for determining the importance of data in a data sharing platform, it is to be understood that various other adaptations and modifications may be made within the spirit and scope of the embodiments herein. For example, while certain embodiments are described herein with respect to sharing data for certain use cases, the techniques herein are not limited as such and the techniques herein can be used to share any number of different types of data, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   using, by a data sharing platform, data associated with a data owner to share data via a plurality of sharing services, each sharing service in the plurality of sharing services providing a different type of data;
   tracking, by the data sharing platform, access to each of the plurality of sharing services to determine a demand for the different type of data provided by each of the plurality of sharing services;
   computing, by the data sharing platform and based in part on the demand for the different type of data provided by each of the plurality of sharing services, an importance metric for the data associated with the data owner; and
   providing, by the data sharing platform, an indication of the importance metric for display to the data owner.

2. The method as in claim 1, wherein at least one of the plurality of sharing services provides data computed using the data associated with the data owner.

3. The method as in claim 1, further comprising:
publishing, by the data sharing platform and to a searchable catalog of services, the plurality of sharing services.

4. The method as in claim 1, further comprising:
using, by the data sharing platform, the importance metric as a credit against use of one or more services by the data owner.

5. The method as in claim 1, further comprising:
computing ratings for the plurality of sharing services, wherein the data sharing platform computes the importance metric for the data associated with the data owner based in part on the ratings.

6. The method as in claim 5, further comprising:
increasing, by the data sharing platform, a rating for a particular one of the plurality of sharing services, based on a popularity of that sharing service.

7. The method as in claim 1, further comprising:
associating, by the data sharing platform, an anonymized token with the data associated with the data owner, prior to using the data associated with the data owner to share data via the plurality of sharing services.

8. The method as in claim 1, wherein the data sharing platform uses the data associated with the data owner based on a request from the data owner to share their data.

9. The method as in claim 1, further comprising:
providing, by the data sharing platform, a popularity metric for one or more of the plurality of sharing services.

10. The method as in claim 1, wherein the plurality of sharing services is accessed via one or more application programming interfaces (APIs) of the data sharing platform.

11. An apparatus, comprising:
one or more network interfaces;
a processor coupled to the one or more network interfaces and configured to execute one or more processes; and
a memory configured to store a process that is executable by the processor, the process when executed configured to:
use data associated with a data owner to share data via a plurality of sharing services, each sharing service in the plurality of sharing services providing a different type of data;
track an access to each of the plurality of sharing services to determine a demand for the different type of data provided by each of the plurality of sharing services;
compute, based in part on demand for the different type of data provided by each of the plurality of sharing services, an importance metric for the data associated with the data owner; and
provide an indication of the importance metric for display to the data owner.

12. The apparatus as in claim 11, wherein at least one of the plurality of sharing services provides data computed using the data associated with the data owner.

13. The apparatus as in claim 11, wherein the process when executed is further configured to:
publish, to a searchable catalog of services, the plurality of sharing services.

14. The apparatus as in claim 11, wherein the process when executed is further configured to:
use the importance metric as a credit against use of one or more services by the data owner.

15. The apparatus as in claim 11, wherein the process when executed is further configured to:
compute ratings for the plurality of sharing services, wherein the apparatus computes the importance metric for the data associated with the data owner based in part on the ratings.

16. The apparatus as in claim 15, wherein the process when executed is further configured to:
increase a rating for a particular one of the plurality of sharing services, based on a popularity of that sharing service.

17. The apparatus as in claim 11, wherein the process when executed is further configured to:
provide a popularity metric for one or more sharing services for display to the data owner.

18. The apparatus as in claim 17, wherein the process when executed is further configured to:
receive, after providing the popularity metric for display to the data owner, a request from the data owner to stop sharing their associated data via the one or more sharing services; and
prevent the data associated with the data owner from being shared via the one or more sharing services.

19. The apparatus as in claim 18, wherein the process when executed is further configured to:
receive, after providing the popularity metric for display to the data owner, a request from the data owner to start sharing their associated data via the one or more sharing services; and
using the data associated with the data owner to share data via the one or more sharing services.

20. A tangible, non-transitory, computer-readable medium storing program instructions that cause a data sharing platform to execute a process comprising:
using, by the data sharing platform, data associated with a data owner to share data via a plurality of sharing services, each sharing service in the plurality of sharing services providing a different type of data;
tracking, by the data sharing platform, access to each of the plurality of sharing services to determine a demand for the different type of data provided by each of the plurality of sharing services;
computing, by the data sharing platform and based in part on the demand for the different type of data provided by each of the plurality of sharing services, an importance metric for the data associated with the data owner; and
providing, by the data sharing platform, an indication of the importance metric for display to the data owner.

* * * * *